United States Patent [19]

Bergman

[11] 4,103,118
[45] Jul. 25, 1978

[54] AUTOBALANCE HYBRID CIRCUIT

[75] Inventor: Jay Richard Bergman, Santa Monica, Calif.

[73] Assignee: Synanon Foundation, Inc., San Francisco, Calif.

[21] Appl. No.: 792,817

[22] Filed: May 2, 1977

[51] Int. Cl.² ............................................. H04B 1/58
[52] U.S. Cl. ........................... 179/170 D; 179/170 R
[58] Field of Search .......... 179/170 R, 170 D, 170 G, 179/81 R, 81 B, 170 NC

[56] References Cited

U.S. PATENT DOCUMENTS

| 2,282,464 | 5/1942 | Edwards et al. | 179/170 R |
| 2,302,374 | 11/1942 | Mitchell | 179/170 D |
| 2,531,883 | 11/1950 | Kaelin | 179/81 B |
| 3,178,521 | 4/1965 | Brown | 179/170 D |
| 3,582,563 | 6/1971 | Cragg | 179/81 R |
| 3,875,350 | 4/1975 | Fischer | 179/170 D |

FOREIGN PATENT DOCUMENTS

| 1,069,308 | 12/1952 | France | 179/170 D |
| 374,528 | 3/1931 | United Kingdom | 179/170 D |

Primary Examiner—Kathleen H. Claffy
Assistant Examiner—Randall P. Myers
Attorney, Agent, or Firm—Spensley, Horn & Lubitz

[57] ABSTRACT

This autobalance hybrid circuit is used to connect a 2-wire duplex telephone line to a 4-wire line which has separate receive and transmit pairs. The impedance of a balancing network automatically is adjusted to equal the impedance of the 2-wire line, thereby maximizing echo return loss. "Howling" and "singing" are eliminated, regardless of changes in the 2-wire line impedance. Balancing is achieved by comparing the absolute values of the receive line audio voltage components appearing across two coupling transformers, one associated with the 2-wire line and the other with the balancing network. A control signal, indicative of the difference between these components, alters the balancing network impedance until equal voltages are achieved. In this condition, the receive signal cancels out as a common mode in the output circuit, so that none of the receive line audio is returned to the transmit pair.

4 Claims, 5 Drawing Figures

AUTOBALANCE HYBRID CIRCUIT

BACKGROUND OF THE INVENTION

1. Field of the Invention

The present invention relates to an autobalance hybrid circuit useful in a telephone system to interconnect a 4-wire telephone line having separate receive and transmit pairs to a 2-wire duplex telephone line, and automatically to compensate for changes in impedance of the 2-wire line.

2. Description of the Prior Art

In telephone systems, the interconnection between a central office and a local switchboard typically employs a 4-wire telephone line in which separate pairs of wires are used for the transmit and receive signals. However, the local switchboard and telephone instruments typically use 2-wire lines in which the same pair of wires is used to carry both the incoming and outgoing audio signals. Interconnection between 4-wire and 2-wire lines is accomplished by using a hybrid coil circuit.

The basic arrangement of a hybrid-coil 2-wire to 4-wire terminating set is well known, and is described e.g., in the *Electronics Engineers' Handbook*, Donald G. Fink, Editor-in-Chief, McGraw-Hill, 1975, in section 22-32. The hybrid is essentially a bridge circuit employing two transformers. One transformer is connected to the 2-wire telephone line, and the other is connected to a balancing network having an impedance which matches that of the 2-wire line as closely as possible over the frequency range of the transmitted audio. When a signal enters the hybrid from the 4-wire receive line, it divides equally between the 2-wire circuit and the network; if these are in balance, no audio signal is sent back to the 4-wire line transmit pair.

If the balance is disturbed, some of the received signal is reflected back to the 4-wire transmit line, and is perceived as an echo. The ratio in decibels between received and reflected power is known as the return loss of the hybrid circuit. If the return loss is low, that is, if a substantial part of the signal is reflected back to the transmit line, objectionable feedback, "singing" or "howling" effects can occur.

In prior art hybrid balancing networks, fixed circuits have been employed using component values selected to match ideal 2-wire line impedances. Such an arrangement represents a compromise that may be acceptable where the 2-wire line impedance is known, and remains constant. Alternatively, manually adjustable balancing networks have been employed, which are optimized for a particular 2-wire line when the hybrid coil is installed. These arrangements are not satisfactory, however, in a situation where the 2-wire line impedance may change substantially from time to time. A principal object of the present invention is to provide a hybrid circuit which dynamically compensates for changes in the 2-wire line impedance.

One example of an application of such an "autobalance" hybrid transformer circuit is in connection with a private telephone exchange of the type where numerous telephone instruments and/or other telephone equipment may be connected at different times to the same 2-wire line. In such a system, at certain times only two persons may be speaking to each other. At other times, three, four or more telephone instruments may be connected to the same 2-wire line. Public address apparatus also occasionally may be connected to such line. Under various of these conditions, the effective impedance of the 2-wire line, as seen by the hybrid, may differ substantially. Howling, singing or other objectionable feedback effects may occur at unpredictable times, when various combinations of individual phone instruments are connected to the same line. The inventive autobalance hybrid transformer circuit is intended to compensate automatically for these changes in impedance, and thereby totally eliminate the problem of howling or singing.

To this end, another objective of the present invention is to provide a hybrid circuit wherein the balancing network is dynamically adjusted to match the impedance of the 2-wire line, thereby maximizing the return loss of the circuit regardless of changes in the 2-wire line impedance. A further object is to achieve such operation by comparing the envelope voltages separately developed across a 2-wire line coupling transformer and a balancing network coupling transformer, and using this difference voltage to adjust the balancing network until a null is achieved.

A further object of the present invention is to provide a unique rectifier envelope detector having a low threshold, and particularly useful in an autobalance hybrid circuit. Yet another objective is to provide a unique combination squelch and automatic gain control (AGC) circuit for use with such a hybrid transformer.

SUMMARY OF THE INVENTION

These and other objectives are achieved by a unique autobalance hybrid transformer, which utilizes a bridge circuit in conjunction with a dynamically adjusted balancing network. A first leg of the bridge is formed by the secondary of a transformer coupled to the 2-wire telephone line. The adjacent leg is formed by the secondary of another coupling transformer connected to the adjustable balancing network. The two sides of a center-tapped primary of an output transformer form the remaining two legs. The secondary of this output transformer is connected to the 4-wire transmit line. The 4-wire receive line is connected across the nodes of the bridge.

A pair of rectifiers is used to detect the envelope voltages which occur respectively across the balancing network coupling transformer and the 2-wire telephone line coupling transformer. These envelope voltages are compared to obtain a control signal for the balancing network. The control signal dynamically adjusts the balancing network so as to match the impedance of the 2-wire telephone line. This exactly balances the bridge, so that any input signal from the 4-wire receive line is equally provided to the two sides of the center-tapped output transformer primary. Under this balanced condition, none of the received signal is coupled back to the 4-wire transmit line because of common mode cancellation.

BRIEF DESCRIPTION OF THE DRAWINGS

A detailed description of the invention will be made with reference to the accompanying drawings wherein line numerals designate corresponding parts in the several figures.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention, since the scope of the invention is best defined by the appended claims.

Operational characteristics attributed to forms of the invention first described also shall be attributed to forms later described, unless such characteristics obviously are inapplicable or unless specific exception is made.

Figure 1:
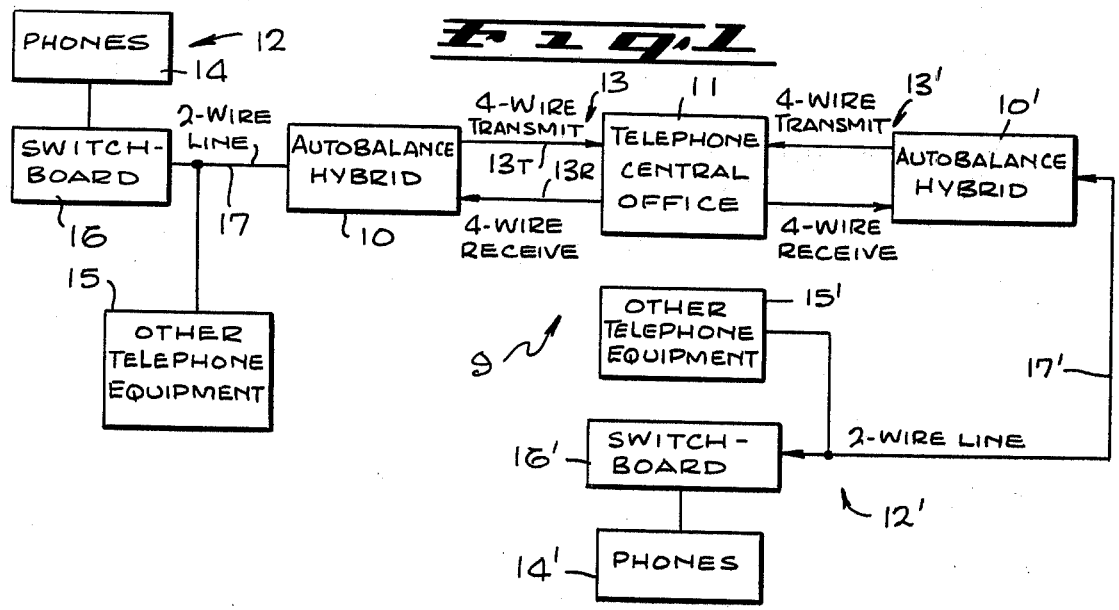
FIG. 1 is a block diagram of a typical telephone installation employing the inventive autobalance hybrid system.

FIG. 1 shows a typical telephone system 9 employing the inventive autobalance hybrid circuit 10. In this system, the interconnection between a telephone central office 11 and a local user installation 12 is via a 4-wire line 13 having a first pair of wires 13R which carry the "receive" audio signal to the local installation 12 and a second pair of wires 13T which "transmit" audio signals back to the central office 11.

At the typical user installation 12, a plurality of telephones 14 and other telephone equipment 15 can be connected either directly or via a switchboard 16 to a 2-wire line 17 which carries both the receive and transmit audio signals. The autobalance hybrid 10 functions to interconnect the 2-wire duplex line 17 to the 4-wire line 13 which leads to the central office 11. As in the case of conventional hybrid circuits, the autobalance hybrid 10 directs a signal originating at the local installation 12 only to the 4-wire transmit line 13T, and supplies incoming signals from the 4-wire receive line 13R to the 2-wire line 17. In the system of FIG. 1, the components having primed numbers correspond to like numbers, but unprimed components, and are associated with another remote user installation 12' that also is connected to the telephone central office 11.

A necessary function of the hybrid 10 is to prevent audio incoming from the receive line 13R from being returned onto the transmit line 13T. If this were to occur, the caller may hear an echo. Under certain conditions, particularly where the echo return loss is low and is exceeded by system gains, a feedback effect will occur causing very objectionable "howling" or "singing" on the line.

Echo return loss is maximized, thereby minimizing the chance for "howling", when the hybrid 10 is adjusted to match the impedance of the 2-wire line 17. However, in a system such as that shown in FIG. 1, the impedance of the line 17 may vary substantially from time to time, depending on the particular combination of telephones 14 and other equipment 15 which is then connected to the 2-wire line 17. If a prior art hybrid circuit were employed, "howling" would occur at those times when, because of the particular combination of equipment connected, the impedance of the 2-wire line 17 was different from the balancing impedance of the hybrid. At other times, when different combinations of telephone 14 and equipment 15 were connected to the 2-wire line 17, the impedance of that line would be close to the impedance of the balancing network in the hybrid, and no "howling" would occur. This objectionable situation, in which "howling" occurs from time to time because of changes in the impedance of the 2-wire line 17, is completely eliminated by the inventive autobalance hybrid 10 which automatically compensates for such changes in 2-wire line impedance. Howl-free operation is achieved regardless of what combination of telephones 14 and other equipment 15 is connected to the line 17.

To this end, the inventive autobalance hybrid circuit 10 (FIG. 2) employs an adjustable balancing network 20 which is driven by a servo loop in such a manner as to compensate automatically for changes in the impedance of the 2-wire telephone line 17. The line 17 is connected to a transformer 21 having a secondary winding 21$s$ which forms one leg of a bridge 22. The adjacent leg of the bridge 22 consists of the secondary winding 23$s$ of a coupling transformer 23 for the balancing network 20. The remaining two legs of the bridge 22 are formed by the pair of center-tapped primary windings 24$p$-1 and 24$p$-2 of a transformer 24 having an output winding 24$s$ that is connected to the 4-wire transmit 13T. The pair of 2-wire receive lines 13R are connected via an optional amplifier 25 to the nodes 22A and 22B of the bridge 22.

With this arrangement, an incoming audio signal from the receive line 13R is divided between the two halves of the bridge 22. Part of the incoming audio signal is applied across the 2-wire line coupling transformer secondary 21$s$ and the output transformer primary portion 24$p$-1. The remainder of the incoming audio signal is applied across the secondary 23$s$ of the balancing network coupling transformer 23 and the other half 24$p$-2 of the output transformer 24 primary.

If the impedance of the balancing network 20 is equal to that of the 2-wire telephone line 17, the incoming audio from the receive line 13R will be equally divided across the center-tapped primary of the output transformer 24. That is, the component of the received audio voltage which appears across the primary winding 24$p$-1 will be equal in magnitude but opposite in polarity to the component which appears across the primary winding 24$p$-2. In this condition, the receive line 13R signal cancels out as a common mode across the primary of the transformer 24, and none of that receive signal is coupled via the secondary 24$s$ to the 4-wire transmit line 13T. This is the desired condition in which the return loss is maximized, thereby minimizing the chance for "howling" to occur.

To maintain this balanced condition, a comparator means 26 is employed to adjust the balancing network 20 in response to changes in the impedance of the 2-wire line 17. To this end, the absolute value of the receive line 13R voltage which appears across the 2-wire line coupling transformer 21 is compared by the means 26 with the component that appears across the balancing network coupling transformer 23. These respective audio voltages are rectified by a pair of envelope detectors 27, 28 which provide inputs to a comparator 29. The output of the comparator 29 is a control signal which is provided to the balancing network via a line 30. This control signal changes the impedance of the balancing network 20 so as to make it equal to the impedance of the 2-wire line 17. When such equality is achieved, the voltages across the transformer windings 21$s$ and 23$s$ will be equal, thereby achieving the desired operational mode in which none of the incoming audio from the receive line 13R is returned back to the 4-wire transmit line 13T. An optional squelch and automatic gain control circuit 70 may be utilized in the transmit line 13T.

Figure 3:
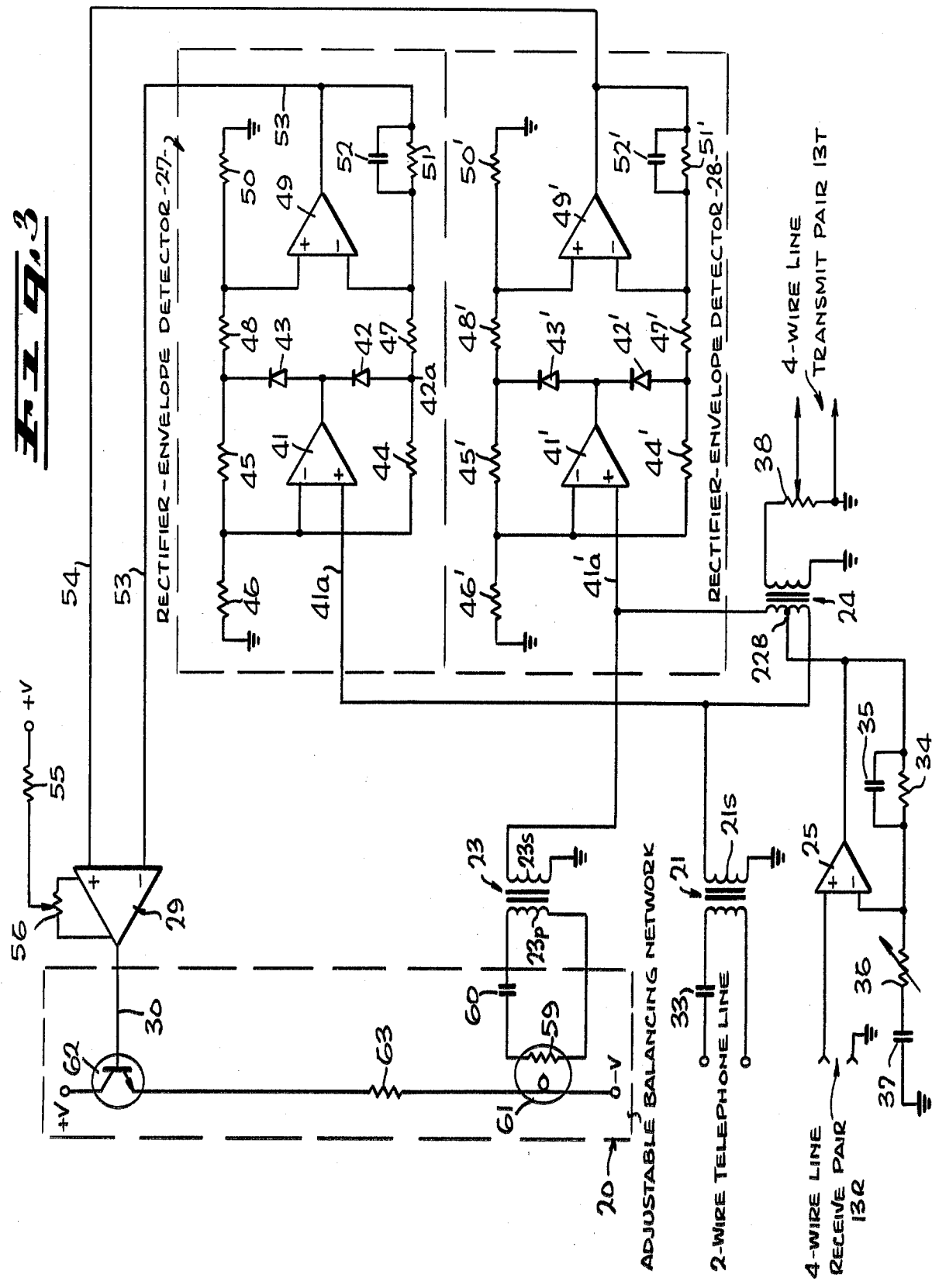
FIG. 3 is an electrical schematic diagram of the autobalance hybrid system of FIG. 2.

Details of the inventive autobalance hybrid 10 are shown in FIG. 3. The 2-wire telephone line 17 is connected to the coupling transformer 21 via a capacitor 33. The amplifier 25 for the 4-wire receive line 13R typically comprises a type LM318AN integrated circuit. Negative feedback is provided by a resistor 34 shunted by a capacitor 35. Gain adjustment is provided by a variable resistor 36 connected in series with a capacitor 37 between the inverting (−) input of the amplifier 25 and ground. The output of the transformer 24 is connected to the 4-wire transmit line 13T via a level control potentiometer 38.

The two rectifier circuits 27 and 28 are identical. Each acts as an envelope detector for the audio voltage developed respectively across the secondaries of the coupling transformers 21 and 23. Components of the rectifier circuit 28 are identified by the primed numbers corresponding to the like numbered, but unprimed components of the rectifier 27.

The circuit 27 is a full wave rectifier which has a low threshold value, is phase insensitive, and has a high input impedance so that the gain of the rectifier 27 is substantially independent of the signal source impedance. The circuit 27 is a modification of that shown in the *National Semiconductor Linear Applications Handbook,* 197 edition, section AN31-12. Unlike the circuit disclosed in that handbook, the input to the present circuit 27 is supplied directly to the non-inverting (+) input 41a of an operational amplifier 41 (typically a type LM318 device). This arrangement maximizes the input impedance of the circuit 27.

The output of the amplifier 41 is supplied to the anode and cathode respectively of a pair of diodes 42, 43. The other terminals of these diodes 42, 43 are connected via respective feedback resistors 44, 45 to the inverting (−) input of the amplifier 41, which input is also connected to ground via a resistor 46. With this arrangement, the voltage developed at the output terminal 42a of the diode 42 for a negative-going input signal on the line 41a will be on the order of twice as great as the voltage developed in the presence a positive-going input signal. Similarly, at the output terminal 43a of the diode 43, the voltage developed in the presence of a positive-going input signal will be about twice as great as that which occurs in the presence of a negative-going input signal.

The signals developed at the terminals 42a and 43a respectively are provided via a pair of resistors 47, 48 to the opposite polarity input terminals of another operational amplifier 49 (also typically a type LM318). The non-inverting input of this amplifier 49 is connected to ground via a resistor 50, and the inverting input is connected to the amplifier 49 output via a feedback resistor 51 shunted by a capacitor 52. With this arrangement, the circuit 49 acts as a differential amplifier responsive to the differences in voltage between the terminals 42a and 43a. For a positive going half cycle of the input signal, the summing amplifier 49 sees twice as great a signal voltage on its non-inverting (+) input than at its inverting (−) input. This results in a net positive-going output signal voltage. For a negative-going half cycle of the input signal, the summing amplifier 49 sees a signal voltage at its inverting input on the order of twice as great as at its non-inverting input. This again results in a net positive-going output signal voltage. As a result the amplifier 49 provides an output signal on a line 53 which corresponds to the dc envelope voltage of the audio signal developed across the secondary 21s of the transformer 21. Similarly, the rectifier 28 provides on a line 54 a signal which represents the envelope voltage of the audio signal developed across the secondary winding 23s of the transformer 23.

The envelope voltages on the lines 53 and 54 are provided to the opposite polarity inputs of an operational amplifier 29 (typically a type LM318) that functions as the comparator 29. The input offset voltage of the operational amplifier 29 and the output offset voltages of rectifier-envelope detectors 27 and 28 are nulled out by the network including a resistor 55 and a potentiometer 56 connected from the positive power supply to the balance inputs of the amplifier 29. Fine balance adjustment is accomplished in this way for maximum return loss.

The output of the amplifier 29 is a signal which is indicative of the difference between the voltage levels on the lines 53 and 54, and hence is indicative of the difference in envelope voltages developed across the secondaries of the coupling transformers 21 and 23. This output is provided on the line 30 as a control signal to the adjustable balancing network 20. As shown in FIG. 3, the network 20 advantageously comprises a light-sensitive resistor 59 connected in series with a capacitor 60 across the primary 23p of the balancing network coupling transformer 23. A lamp 61 illuminates the resistor 59. This lamp 61 is driven by a transistor 62 via a resistor 63. The control signal on the line 30 is supplied to the base of the transistor 62, and so functions to change the conductivity of the transistor 62 and thereby change the amount of light produced by the lamp 61. This in turn changes the resistance of the resistor 59, thereby changing the impedance of the balancing network 20. The change in impedance is in such a direction as to compensate for changes in the impedance of the 2-wire telephone line 17. Thus the comparator means 26 cooperates with the adjustable balancing network 20 to function as a servo loop which maintains the impedance of the balancing network 20 at a value equal to that of the 2-wire telephone line 17. In the balanced condition achieved by this servo loop, incoming audio from the 4-wire receive line 13R is equally applied to the two sides of the center-tapped output transformer 24, so that none of the receive audio is fed back to the 4-wire transmit line 13T. Howl-free telephone system operation is achieved.

Figure 2:
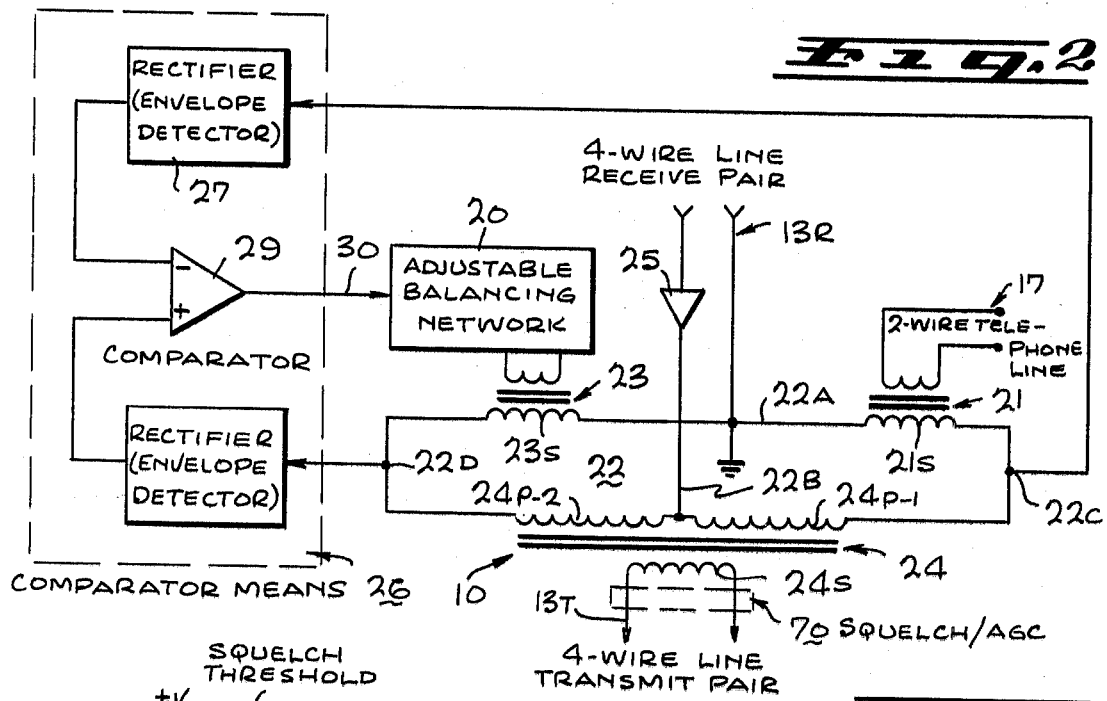
FIG. 2 is an electrical block diagram of the inventive autobalance hybrid system.

When outgoing audio is present on the 2-wire telephone line 17, the inventive autobalance hybrid will provide the signal to the 4-wire transmit line 13T. As can be seen in FIG. 2, this outgoing audio appears across the secondary 21s of the 2-wire line coupling transformer 21. Thus the audio is applied across the entire output transformer 24 primary which is connected in series with the other coupling transformer secondary 23s across the 2-wire line coupling transformer secondary 21s. Under this condition, the signal components across the two output transformer primary windings 24p-1 and 24p-2 do not cancel out, but rather both contribute to coupling of the outgoing audio signal to the 4-wire transmit line 13T.

In this outgoing audio mode, the comparator means 26 and the balancing network 20 also are operative to insure impedance matching with the 2-wire telephone line 17. To accomplish this, the rectifier circuits 27 and 28 are phase insensitive. Thus the rectifiers 27 and 28 operate as described above both during reception of audio from the 4-wire receive line 13R, at which time the polarities at the bridge nodes 22C and 22D are the same, and during transmission of outgoing audio from the 2-wire line 17, under which condition the voltage polarities at the nodes 22C and 22D are opposite. Audio coming in from the 4-wire receive line 13R is coupled via the transformer 21 to the 2-wire telephone line 17. A 6 db loss occurs, since half of the received audio is applied across the balancing network coupling transformer 23.

From the foregoing discussion, it is clear that the inventive autobalance hybrid circuit 10 will maintain the balancing network 20 impedance at a value equal to that of the 2-wire line 17 so long as an audio signal is present, either from the receive line 13R or from the 2-wire line 17, that provides voltages at the nodes 22C and 22D which are above the threshold level of the rectifiers 27 and 28. Thus it is advantageous to employ rectifier circuits 27 and 28 which have a low detection threshold such as that exhibited by the rectifier circuits shown in FIG. 3. When the voltages at the bridge nodes 22C and 22D are below the rectifier threshold levels, the hybrid 10 will not maintain balance. Such unbalance is not objectionable at that time, since either no audio is being received or transmitted, or the audio level is of an extremely low level. Nevertheless, it may be desirable to provide a squelch circuit for the 4-wire transmit line 13T which will eliminate any audio from that line when the input signal levels are below the threshold level of the rectifiers 27 and 28. A squelch circuit useful for this purpose, and combined with an automatic gain control (AGC), is shown in FIG. 4.

Figure 4:
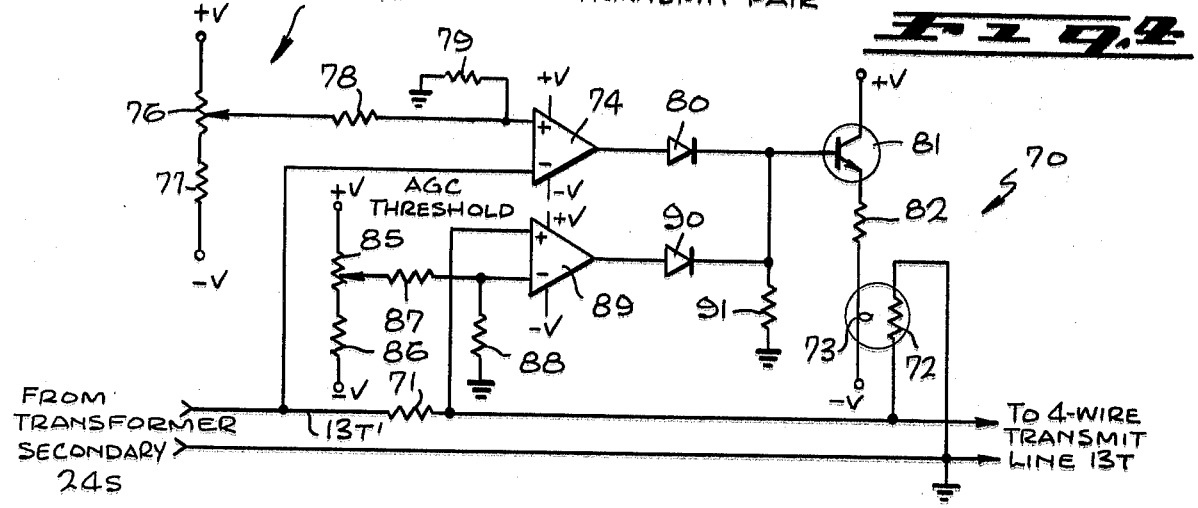
FIG. 4 is an electrical schematic diagram of a squelch and automatic gain control circuit useful with the hybrid system of FIG. 3.

Referring to FIG. 4, the combined squelch and AGC circuit 70 advantageously is connected between the output transformer 24 of the autobalance hybrid 10 (FIG. 2) and the 4-wire transmit line 13T. A resistor 71 in series with one transmit line 13T' and a light-sensitive resistor 72 connected across the transmit line pair 13T together constitute an attenuation pad for transmitted audio. The resistor 72 is illuminated by a lamp 73. When this lamp 73 is off, the resistor 72 exhibits a high resistance, so that very little attenuation is inserted in the transmit line 13T. However, when the light 73 is brightly illuminated, the resistor 72 will drop to a very low value so that the very high attenuation (typically on the order of −50 db) will be introduced. This occurs under squelch conditions.

The squelch portion of the circuit 70 includes an operational amplifier 74 (typically a type LM301), the inverting (−) input of which is connected via a line 75 from transformer secondary 24s. The non-inverting (+) input of the amplifier 74 is provided with a voltage from a network consisting of a potentiometer 76 and a set of resistors 77-79. The setting of the potentiometer 76 establishes the squelch threshold level. If the audio output from the transformer 24 of the hybrid 10 is below the squelch threshold level, the amplifier 74 will provide a signal via a diode 80 to turn on a transistor 81 that supplies voltage via a resistor 82 to the lamp 73. As a result, the resistor 72 will drop its value, thereby inserting a low impedance in the transmit line 13T to accomplish a squelch effect.

The AGC portion of the circuit 70 limits the amplitude of the audio signal supplied to the transmit line 13 to a maximum value set by a potentiometer 85. This operates as part of a network including a set of resistors 86 through 88 to establish an AGC threshold control voltage at the inverting (−) input of an amplifier 89 (which also may be a type LM301). The full audio output voltage, from the output side of the resistor 71, is applied to the non-inverting (+) input terminal of the amplifier 89. With this arrangement, if the peaks of the transmitted audio signal exceed the AGC threshold level, a signal is provided via a diode 90 and a resistor 91 to turn on the transistor 81. This in turn provides voltage to the lamp 73, thereby reducing the value of the resistor 72 so as to attenuate the output signal. Attenuation of the output signal reduces the peak voltage of the input signal applied to the non-inverting (+) input of the amplifier 89. Thus a negative feedback path exists and automatic gain control is achieved.

The light dependent resistor 59 and associated lamp 61 (FIG. 3) may comprise a single unit available commercially as a type VTL3A47 device manufactured by the Vac-Tec Corporation. The light dependent resistor 72 and its associated lamp 73 may be implemented by using a like device. Although not shown, isolation transformers may be used to connect the inventive autobalance hybrid 10 to the transmit and receive pairs 13T and 13R. Additional amplification (not shown) may be provided in the transmit line 13T.

Figure 5:
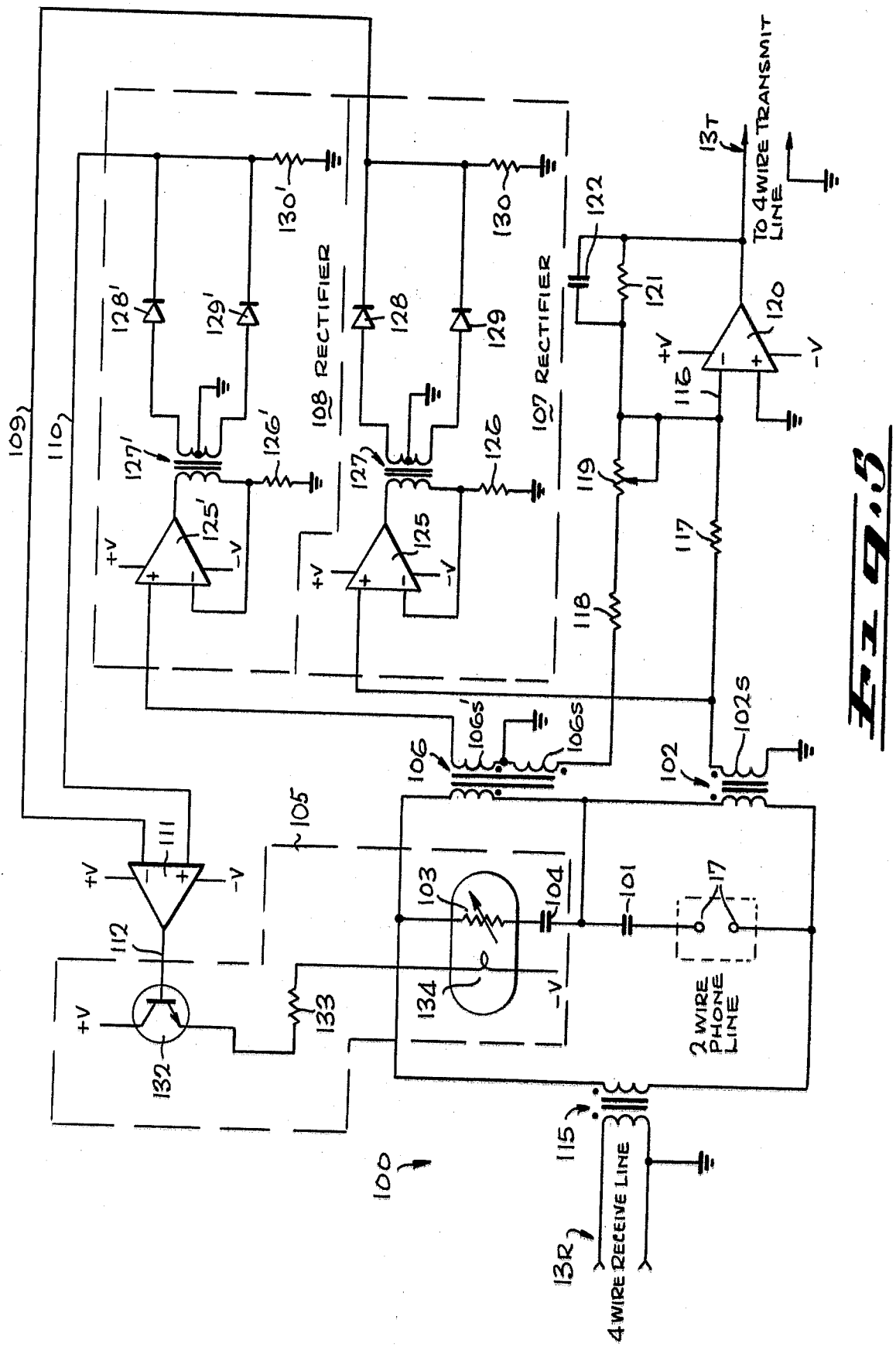
FIG. 5 is an electrical schematic diagram of another embodiment of the invention.

An alternative embodiment 100 of the inventive autobalance hybrid is shown in FIG. 5. Referring thereto, the 2-wire telephone line 17 is connected via a capacitor 101 to the primary of a coupling transformer 102. A light-dependent resistor 103 and a capacitor 104, which form part of an adjustable balancing network 105, are connected across the primary of another coupling transformer 106 and serve as the adjustable balancing impedance.

The envelope voltage developed across the 2-wire telephone line coupling transformer 102 is detected by a rectifier circuit 107. The envelope voltage developed across the balancing network coupling transformer 106 is detected by a rectifier circuit 108. The outputs of the rectifiers 107 and 108 are provided on respective lines 109 and 110 to the inputs of a differential amplifier 111 which acts as a comparator. The comparator 111 in turn provides a control signal via a line 112 which adjusts the balancing network 105 in such a manner as to cause the balancing impedance to equal the impedance of the 2-wire telephone line 17.

The 4-wire receive line 13R is connected via a coupling transformer 115 across the series-connected primaries of the transformers 102 and 106. When the balancing network impedance equals that of the 2-wire telephone line 17, an incoming audio signal from the 4-wire receive line 13R will cause signals of equal magnitude to be induced in the secondary winding 102s of the transformer 102 and in a secondary winding 106s of the transformer 106. These voltages will cancel each other out at a summing point 116 to which they are fed via a set of resistors 117-119. The summing point 116 is at the inverting (−) input of an operational amplifier 120 which is provided with a negative feedback resistor 121 shunted by a capacitor 122. Under the balanced conditions just described, no portion of an audio signal incoming from the receive line 13R will be supplied via the summing amplifier 120 to the 4-wire transmit line 13T. The receive audio will be supplied, however, to the 2-wire telephone line 17. Since the receive audio is fed across the series connected primaries of the coupling transformers 102 and 106, that portion of the received signal which appears across the coupling transformer 102 primary will be fed directly to the 2-wire line 17.

The rectifier circuit 107 uses an amplifier 125 and the transformer 102 in a transconductance amplifier configuration, the output impedance of which approaches infinity (limited mostly by transformer 102 losses). The output current is rectified by a pair of diodes 128, 129 in a full wave center-tapped secondary configuration. The resultant output voltage developed across a resistor 130 is largely independent of the diode 128 and 129 junction drops. Thus low threshold, full wave rectification is achieved.

The rectifier 108 has components identical to those of the rectifier 107, and identified by corresponding, but primed numerals. The input signal to the rectifier 108 is developed across a separate secondary winding 106s' of the balancing network coupling transformer 106.

The balancing network 105 is like that of FIG. 3, and includes a transistor 132 the conduction of which is controlled by the signal on the line 122 from the comparator 111. When the transistor 132 goes on, voltage is supplied via a resistor 133 to a lamp 134 that illuminates, and hence changes the resistance of the resistor 103. Operation of the circuit is such that the value of the resistor 103 will be adjusted until the balancing impedance across the transformer 106 is equal to the impedance of the 2-wire telephone line 17. This insures proper operation of the inventive autobalance hybrid system.

Intending to claim all novel, useful and unobvious features shown or described, the inventor:

I claim:

1. An autobalance hybrid circuit for connecting a 4-wire telephone line having separate receive and transmit pairs to a 2-wire line, comprising:
   a balancing network having an impedance that is adjustable in response to a control signal,
   a bridge formed of (a) a 2-wire telephone line coupling transformer connected to said 2-wire line, (b) a balancing network coupling transformer connected to said network, and (c) the two sides of the center-tapped primary of an output transformer, the secondary of said output transformer being connected to the 4-wire line transmit pair,
   the 4-wire line receive pair being connected across two nodes of said bridge, between the center tap of said output transformer primary and the junction connecting said coupling transformers, and
   comparator means, connected to the other two nodes of said bridge at the junctions connecting the ends of said center-tapped primary with the respective coupling transformers, for comparing the envelope voltages developed across said two coupling transformers in the bridge, and for providing a control signal to said balancing network which causes adjustment thereof so as to equalize said voltages, said hybrid circuit in this manner compensating for changes in the impedance of said 2-wire telephone line and preventing any audio input from said 4-wire line receive pair from being returned via said output transformer onto said 4-wire line transmit pair, said comparator means comprising:
   a first rectifier circuit having a low threshold, said first rectifier circuit being connected across the secondary of said 2-wire telephone line coupling transformer and developing a first voltage signal indicative of the magnitude of the envelope of an audio signal appearing across that 2-wire telephone line coupling transformer,
   a second rectifier circuit having a low threshold, said second rectifier circuit being connected across the secondary of said balancing network coupling transformer and developing a second voltage signal indicative of the magnitude of the envelope of an audio signal appearing across that balancing network coupling transformer, and
   a differential amplifier having two comparison inputs connected respectively to said first and second rectifier circuits, said differential amplifier comparing said first and second voltage signals and producing a control signal indicative of the difference therebetween, the output of said differential amplifier being connected to said balancing network so as to provide said control signal therto, together with
   a squelch circuit connected between the secondary of said output transformer and said 4-wire line transmit pair, the threshold of said squelch circuit being set so that squelch occurs whenever the audio signals across said 2-wire telephone line coupling transformer and said balancing network coupling transformer both are below the threshold of the respective first and second rectifier circuits.

2. An autobalance hybrid circuit for connecting a 4-wire telephone line having separate receive and transmit pairs to a 2-wire line, comprising:
   a balancing network having an impedance that is adjustable in response to a control signal,
   a bridge formed of (a) a 2-wire telephone line coupling transformer connected to said 2-wire line, (b) a balancing network coupling transformer connected to said network, and (c) the two sides of the center-tapped primary of an output transformer, the secondary of said output transformer being connected to the 4-wire line transmit pair,
   the 4-wire line receive pair being connected across two nodes of said bridge, between the center tap of said output transformer primary and the junction connecting said coupling transformers, and
   comparator means, connected to the other two nodes of said bridge at the junctions connecting the ends of said center-tapped primary with the respective coupling transformers, for comparing the envelope voltages developed across said two coupling transformers in the bridge, and for providing a control signal to said balancing network which causes adjustment thereof so as to equalize said voltages, said hybrid circuit in this manner compensating for changes in the impedance of said 2-wire telephone line and preventing any audio input from said 4-wire line receive pair from being returned via said output transformer onto said 4-wire line transmit pair, said comparator means comprising:
   a first rectifier circuit having a low threshold, said first rectifier circuit being connected across the secondary of said 2-wire telephone line coupling transformer and developing a first voltage signal indicative of the magnitude of the envelope of an audio signal appearing across that 2-wire telephone line coupling transformer,
   a second rectifier circuit having a low threshold, said second rectifier circuit being connected across the secondary of said balancing network coupling transformer and developing a second voltage signal indicative of the magnitude of the envelope of an audio signal appearing across that balancing network coupling transformer, and
   a differential amplifier having two comparison inputs connected respectively to said first and second rectifier circuits, said differential amplifier comparing said first and second voltage signals and producing a control signal indicative of the difference therebetween, the output of said differential amplifier being connected to said balancing network so as to provide said control signal thereto, and wherein each rectifier circuit comprises:
- a first operational amplifier having a non-inverting input connected directly to the secondary of the respective 2-wire telephone line coupling transformer of balancing network coupling transformer,
- a pair of diodes, one polarity terminal of one diode and the opposite polarity terminal of the other diode being connected to the output of said first operational amplifier, and
- a second operational amplifier having its inverting and non-inverting inputs connected respectively to the other terminals of said pair of diodes so as to provide an output voltage signal indicative of the difference between the voltages developed across said pair of diodes.

3. An autobalance hybrid circuit for connecting a 4-wire telephone line having separate receive and transmit pairs to a 2-wire line, comprising:
- a balancing network having an impedance that is adjustable in response to a control signal,
- a bridge formed of (a) a 2-wire telephone line coupling transformer connected to said 2-wire line, (b) a balancing network coupling transformer connected to said network, and (c) the two sides of the center-tapped primary of an output transformer, the secondary of said output transformer being connected to the 4-wire line transmit pair,
- the 4-wire line receive pair being connected across two nodes of said bridge, between the center tap of said output transformer primary and the junction connecting said coupling transformers, and
- comparator means, connected to the other two nodes of said bridge at the junctions connecting the ends of said center-tapped primary with the respective coupling transformers, for comparing the envelope voltages developed across said two coupling transformers in the bridge, and for providing a control signal to said balancing network which causes adjustment thereof so as to equalize said voltages, said hybrid circuit in this manner compensating for changes in the impedance of said 2-wire telephone line and preventing any audio input from said 4-wire line receive pair from being returned via said output transformer onto said 4-wire line transmit pair, said comparator means comprising:
- a first rectifier circuit having a low threshold, said first rectifier circuit being connected across the secondary of said 2-wire telephone line coupling transformer and developing a first voltage signal indicative of the magnitude of the envelope of an audio signal appearing across that 2-wire telephone line coupling transformer,
- a second rectifier circuit having a low threshold, said second rectifier circuit being connected across the secondary of said balancing network coupling transformer and developing a second voltage signal indicative of the magnitude of the envelope of an audio signal appearing across that balancing network coupling transformer, and
- a differential amplifier having two comparison inputs connected respectively to said first and second rectifier circuits, said differential amplifier comparing said first and second voltage signals and producing a control signal indicative of the difference therebetween, the output of said differential amplifier being connected to said balancing network so as to provide said control signal therto, and wherein said balancing network comprises:
- a capacitor and a light-dependent resistor connected as an impedance network across the primary of said balancing network coupling transformer,
- a lamp situated to illuminate said light-dependent resistor, and
- a lamp supply circuit connected to said lamp and connected to said comparator means to receive said control signal therefrom, said supply circuit providing to said lamp an amount of power established by the magnitude of said control signal.

4. An autobalance hybrid circuit for connecting a 4-wire telephone line having separate receive and transmit pairs to a 2-wire duplex telephone line, comprising:
- a balancing network having an impedance that is adjustable in response to a control signal,
- a first coupling transformer having its primary winding connected to said 2-wire telephone line,
- a second coupling transformer having its primary winding connected across said balancing network, the primary windings of said first and second coupling transformers being connected in series,
- a third coupling transformer having its secondary winding connected across the series-connected primary windings of said first and second coupling transformers, the primary of said third coupling transformer being connected to the received pair of said 4-wire telephone line,
- first and second rectifier circuits connected respectively to the secondary windings of said first and second coupling transformers for deriving therefrom a pair of envelope voltages,
- a comparator connected to the outputs of said rectifier circuits for comparing the envelope voltages developed thereby and for producing a control signal indicative of the difference therebetween, said control signal being supplied to said balancing network and causing adjustment of the impedance thereof so as to equalize said envelope voltages,
- an operational amplifier having an input summing point, the secondaries of said first and second coupling transformers both being connected to said summing point with respective polarities such that when said envelope voltages are equal, the portion of the audio incoming from said 4-wire receive line and coupled to said summing point via said first and third coupling transformers will cancel the portion of said incoming audio supplied to said summing point via said second and third coupling transformers, the output of said operational amplifier being connected to the transmit pair of said 4-wire telephone line.

* * * * *